(12) United States Patent
Alton et al.

(10) Patent No.: US 8,930,410 B2
(45) Date of Patent: Jan. 6, 2015

(54) QUERY TRANSFORMATION FOR MASKING DATA WITHIN DATABASE OBJECTS

(75) Inventors: Eric L. Alton, Markham (CA); Thomas A. Beavin, Milpitas, CA (US); Harley W. Boughton, Mississauga (CA); Yao-Ching S. Chen, Saratoga, CA (US); Curt L. Cotner, Gilroy, CA (US); Yuping Ding, Markham (CA); Dengfeng Gao, San Jose, CA (US); Gerald G. Kiernan, San Jose, CA (US); Xun Li, San Jose, CA (US); Irene C. Liu, San Jose, CA (US); Walid Rjaibi, Markham (CA); Gregory R. Stager, Markham (CA); Joyce A. Taylor, San Jose, CA (US); Timothy J. Vincent, Toronto (CA); Liyan Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 13/251,448

(22) Filed: Oct. 3, 2011

(65) Prior Publication Data

US 2013/0086088 A1    Apr. 4, 2013

(51) Int. Cl.
*G06F 17/30* (2006.01)

(52) U.S. Cl.
CPC ................ *G06F 17/30477* (2013.01)
USPC ........................................... 707/802

(58) Field of Classification Search
CPC ................................ G06F 17/30477
USPC ................................ 707/754, 757
See application file for complete search history.

(56) References Cited

U.S. PATENT DOCUMENTS

| 6,487,552 | B1   | 11/2002 | Lei et al. |
| 6,839,701 | B1   | 1/2005  | Baer et al. |
| 7,240,046 | B2   | 7/2007  | Cotner et al. |
| 7,310,647 | B2 * | 12/2007 | Lei et al. ..................... 1/1 |

(Continued)

FOREIGN PATENT DOCUMENTS

WO    2004066128    8/2004

OTHER PUBLICATIONS

Yee, et al., "Masked Queries for Search Assuracy in Peer to Peer File Sharing Systems", IPDPS IEEE International Conference on, Mar. 26-30, 2007, pp. 1-10.*

(Continued)

*Primary Examiner* — Sheree Brown
(74) *Attorney, Agent, or Firm* — Mohammed Kashef; Edell, Shapiro & Finnan, LLC (57) ABSTRACT

According to one embodiment of the present invention, a system processes a database query, and comprises a computer system including at least one processor. The system identifies one or more expressions within the database query utilizing a database object with value masking. Masking requirements are determined for each identified expression and the database object utilized by that identified expression is replicated to provide masked and actual versions of that database object in response to the masking requirements for that expression including masked values and actual values of that database object. The value masking of the database object is applied to the identified expressions within the database query based on the determined masking requirements to produce search results with masked values for the database query. Embodiments of the present invention further include a method and computer program product for processing a database query in substantially the same manner described above.

21 Claims, 5 Drawing Sheets

(56) References Cited

U.S. PATENT DOCUMENTS

| | | | |
|---|---|---|---|
| 7,711,741 B2 | 5/2010 | Lawler et al. | |
| 7,877,398 B2 | 1/2011 | Kroeschel et al. | |
| 7,882,134 B2 | 2/2011 | Pattabhi et al. | |
| 7,974,942 B2 | 7/2011 | Pomroy et al. | |
| 8,661,263 B2* | 2/2014 | Mattsson | 713/189 |
| 2002/0095405 A1* | 7/2002 | Fujiwara | 707/3 |
| 2003/0014394 A1 | 1/2003 | Fujiwara et al. | |
| 2004/0139043 A1 | 7/2004 | Lei et al. | |
| 2005/0144176 A1* | 6/2005 | Lei et al. | 707/100 |
| 2005/0198043 A1 | 9/2005 | Gruber et al. | |
| 2005/0289342 A1 | 12/2005 | Needham et al. | |
| 2006/0074897 A1 | 4/2006 | Fergusson | |
| 2006/0248592 A1 | 11/2006 | Agrawal et al. | |
| 2007/0110224 A1 | 5/2007 | Gumpel et al. | |
| 2007/0136245 A1* | 6/2007 | Hess et al. | 707/3 |
| 2007/0136291 A1 | 6/2007 | Bird et al. | |
| 2007/0156691 A1 | 7/2007 | Sturms et al. | |
| 2008/0065665 A1 | 3/2008 | Pomroy et al. | |
| 2008/0082834 A1* | 4/2008 | Mattsson | 713/189 |
| 2009/0100527 A1 | 4/2009 | Booth et al. | |
| 2009/0132419 A1 | 5/2009 | Grammer et al. | |
| 2009/0204631 A1 | 8/2009 | Pomroy et al. | |
| 2009/0271361 A1 | 10/2009 | Pattabhi et al. | |
| 2010/0027367 A1 | 2/2010 | Manning | |
| 2010/0030795 A1 | 2/2010 | Pattabhi et al. | |
| 2010/0114831 A1* | 5/2010 | Gilbert et al. | 707/648 |
| 2010/0146120 A1 | 6/2010 | Anipko et al. | |
| 2010/0205189 A1 | 8/2010 | Ebrahimi et al. | |
| 2012/0197919 A1* | 8/2012 | Chen et al. | 707/757 |
| 2012/0317073 A1* | 12/2012 | Zhou et al. | 707/610 |

OTHER PUBLICATIONS

IBM et al., "Data Masking Method for Secured Data", IPCOM0001852151D, Jul. 17, 2009. 5 pages.*

Agrawal et al., "Extending Relational Database Systems to Automatically Enforce Privacy Policies", 2005, 10 pages.*

Yee et al., "Masked Queries for Search Accuracy in Peer-to-Peer File Sharing Systems", IPDPS IEEE International Conference on, Mar. 26-30, 2007, pp. 1-10.

IBM et al.; "Data Masking Method for Secured Data", IPCOM0001852151D, Jul. 17, 2009, 5 pages.

Kulkarni et al., "Automated Analysis of Data Masking Activity", TACTiCS TCS Technical Architects Conference '07, 2007.

* cited by examiner

```
                                      100b
             102a  100a                            100c
SELECT DISTINCT Y.C1 || T3.C1, Y.C2 + 10, Y.C3
FROM (SELECT SUBSTR(X.C1, 1, 4), X.C2 * 0.1, T2.C1      102c
          FROM (SELECT RIGHT(C1, 10), C2 + C3    102b
    102            FROM T1                    104b
            104    FETCH FOR 10 ROWS ONLY   104a
          ) X(C1, C2),
        T2
      ORDER BY 2
    ) Y(C1, C2, C3),
  T3
WHERE Y.C1 = 'A';
```

```
100
  ↘
  SELECT DISTINCT  Y.C6 || CM(T3.C1),  Y.C5 + 10,  Y.C4,  YC3,  Y.C2+10,  Y.C1 || T3.C1
    FROM (SELECT SUBSTR(X.C1, 1, 4),  X.C2 * 0.1,  T2.C1,  CM(T2.C1),  X.C3 *
  0.1,
      102 ⟶    SUBSTR(X.C4, 1, 4),
              FROM (SELECT  RIGHT(C1, 10),  C2 + C3,  CM(C2)+CM(C3),
  RIGHT(CM(C1),10)
              104 ⟶  FROM  T1
                     FETCH FOR 10 ROWS ONLY
                  ) X(C1, C2, C3, C4),
              T2
           ORDER BY 2
         ) Y(C1, C2, C3, C4, C5, C6)
       T3
    WHERE Y.C1 = 'A';
```

FIG.3C

QUERY TRANSFORMATION FOR MASKING DATA WITHIN DATABASE OBJECTS

BACKGROUND

1. Technical Field

Embodiments of the present invention relate to controlling access to data of database objects, and more specifically, to controlling access to sensitive data within database table columns while maintaining data integrity for results of database query expressions.

2. Discussion of the Related Art

Fine-Grained Access Control (FGAC) has grown in importance to commercial and government users of relational databases, especially with respect to recent government initiatives being established to strengthen overall security. Fine-Grained Access Control (FGAC) can be used for complying with various data protection laws and similar requirements (e.g., Gramm-Leach Bliley Act, Health Insurance Portability and Accountability Act, EU Data Protection Directive, Privacy laws in Canada, Japan, and Australia, Payment Card Industry Data Security Standards, Interagency Guidelines for Safeguarding Customer Information, Basel II operational controls, Sarbanes-Oxley internal controls, in response to high profile privacy breaches and identity theft cases, in response to customer and vendor pressure for increased privacy and security, etc.).

Fine-Grained Access Control (FGAC) may be implemented using row permissions and column masks for database tables. A row permission is a database object that expresses a row access control rule for a specific table, where the rule describes the conditions enabling access to the rows of data within that specific table. A column mask is a database object that expresses a column access control rule for a specific database table column, where the column control rule describes conditions enabling reception of masked values from a database table column. Column masks are used to mask corresponding column values, and determine values in a final result table (but do not interfere with the operations of other clauses in the statement (e.g., WHERE, HAVING, GROUP BY, ORDER BY, SELECT DISTINCT, UNION, INTERSECT, and EXCEPT clauses)). The number of rows returned in the final result table remain the same, except that the values in the resultant rows may be masked by column masks. However, if the masked column also appears in an expression (e.g., ORDER BY sort-key, SELECT DISTINCT, etc.), the masked values in the final result table may not properly reflect the result of the expression since the masked values are used in the evaluation of the expression (or, in other words, the column mask is applied to the database table column before evaluation of the expression).

BRIEF SUMMARY

According to one embodiment of the present invention, a system processes a database query, and comprises a computer system including at least one processor. The system identifies one or more expressions within the database query utilizing a database object with value masking. Masking requirements are determined for each identified expression and the database object utilized by that identified expression is replicated to provide masked and actual versions of that database object in response to the masking requirements for that expression including masked values and actual values of that database object. The value masking of the database object is applied to the identified expressions within the database query based on the determined masking requirements to produce search results with masked values for the database query. Embodiments of the present invention further include a method and computer program product for processing a database query in substantially the same manner described above.

DETAILED DESCRIPTION

Embodiments of the present invention pertain to controlling access to sensitive data within database table columns while maintaining data integrity for results of database query expressions. Initially, Fine-Grained Access Control (FGAC) is implemented using row permissions and column masks for database tables. A row permission is a database object that expresses a row access control rule for a specific database table. In an example embodiment of the present invention, the rule may be in the form of a Structured Query Language (SQL) search condition that describes the conditions (e.g., particular users, occurrence of conditions, etc.) for accessing data within table rows. For example, a CREATE PERMISSION statement with a FOR ROWS clause may be utilized to create a row permission object.

A column mask is a database object that expresses a column access control rule for a specific database table column. In an example embodiment of the present invention, the column mask may contain a rule in the form of a case (e.g., SQL CASE) expression that describes the conditions (e.g., authorized users, etc.) for receiving masked values from a database table column. Further, a CREATE MASK statement may enable a user to create a column mask object. Plural column masks may be created for a database table, but each column is limited to a single column mask. The definition of a column mask may reference the user, role, or group in the case expression. The case expression may mask the stored column value before returning the column value to the application. The case expression may conditionally determine the manner in which a value is returned based on runtime conditions. Column masks are used to mask database table column values, and determine values in the final result table. However, the column masks do not interfere with operations of other clauses in the database query statement (e.g., WHERE, HAVING, GROUP BY, ORDER BY, SELECT DISTINCT, UNION, INTERSECT, and EXCEPT). The rows returned in the final result table remain the same, except that the values in the resultant rows may be masked by column masks.

If a masked column appears in a database query expression, the column mask is applied to the column before the expression evaluation occurs, thereby altering and affecting the result of the expression. When the masked column appears in a sort-key of an ORDER BY expression, the masked values in the final result table may not reflect the order enforced by that expression since the sort operation is performed on the original or unmasked column values. Similarly, masked values may not reflect the uniqueness enforced by a SELECT DISTINCT expression.

Present invention embodiments provide manners to ensure that the application of column masks does not affect expressions within the database query and the resulting rows in the final result table (but rather, simply enables masking of the values in the final result table). For example, present invention embodiments identify column references within a database query that are directly or indirectly included in the final result set, thereby requiring application of a column mask. An example column reference that is directly included in the final result set includes a table column referenced in an outermost SELECT expression (e.g., with respect to a lone expression or nested expressions) as follows.

SELECT c1 FROM t1; (selecting a column, c1, from a table, t1)

Present invention embodiments enable column references in predicates to operate on unmasked values, even in the event the references refer to masked columns. For example, this includes expressions within WHERE, HAVING, ON, or WHEN clauses. In the following example query, the reference to column, c1, of table, t1, in the argument list of the SELECT expression requires application of the column mask to column, c1, while the reference to column, c1, in the WHERE clause requires unmasked values from that column.

SELECT c1 FROM t1 WHERE c1>0; (selecting a column, c1, from table, t1, for column values greater than zero).

With respect to this example query, present invention embodiments utilize unmasked values of the table column to determine values greater than zero, while returning masked values in the final results.

Further, column references in ORDER BY, DISTINCT, and GROUP BY expressions are provided with unmasked column values by present invention embodiments to ensure proper results. For example, in the following query, the reference to column, c1, in the ORDER BY expression or clause requires unmasked values from that column.

SELECT c1 FROM t1 ORDER BY c1; (selecting a column, c1, from table, t1, with the results ordered by the column values).

With respect to this example query, present invention embodiments utilize unmasked values of the table column to order the final results (even when the final results include masked column values).

When a column reference in an expression requires a column mask, present invention embodiments apply the mask prior to the column value being utilized in the expression. For example, in the following query, the mask for column, c1, of table, t1, is applied to the column value prior to the addition operation (e.g., this example typically refers to the case where the masked value is of the same data type as the column values to enable the addition with respect to masked values).

SELECT c1+10 FROM t1; (select column, c1, from table, t1, and add ten to the column value).

However, a column reference may be provided to an expression, where the expression result is referenced within a context that requires masked values and within a context that requires unmasked values as indicated in the following example query.

SELECT x FROM (SELECT c1+10 FROM t1) AS t (x) WHERE x>5 (selecting a column, x, from a table formed by selecting a column, c1, from table, t1, and adding ten to the column value, where the results include column values of the formed table greater than five). The indirect reference to column, c1, of table, t1, in the argument list of the outermost SELECT expression (e.g., referenced by "x" in the SELECT statement) requires the application of the column mask. The reference to this column within the WHERE clause (e.g., "x>5") does not require the column mask. This column is further provided to the addition ("+") function in a table expression (e.g., "SELECT c1+10 FROM t1") that supplies data to both column references in the outermost SELECT expression or clause (e.g., "SELECT x" and "WHERE x>5"). Present invention embodiments duplicate or replicate the expression (and corresponding column) to produce a modified query equivalent to the following.

SELECT x' FROM (SELECT mask(c1)+10, c1+10 FROM t1) AS t(x', x) WHERE x>5; where mask(c1) represents the mask applied to base table column, c1, and x' represents the masked results.

This replication provides two columns (and corresponding expressions), where one column (and corresponding expression) enables masked values of the original column, c1 (referred to as mask(c1)), to be provided in the final result set, and the other column (and corresponding expression) enables unmasked values of the original column, c1, to be utilized for evaluation of the predicate ("x>5").

Present invention embodiments provide special consideration when a column is referenced on a null producing side of an outer join since a column mask defined on a non-null column (e.g., non-null attribute) inherits the non-null (e.g., NOT NULL) property. Further, present invention embodiments ensure that a column with an enabled column mask is not provided to a non-secured user-defined function (e.g., user-defined function (UDF) with a NOT SECURED attribute).

Present invention embodiments provide a query transformation that employs an analysis phase and an application phase. The analysis phase traverses a query to identify column references that require the application of a column mask. The analysis phase basically traces or maps the column references within the query to corresponding columns of underlying base tables in children or nested query blocks to facilitate determination of column references requiring application of column masks. The application phase selectively applies the column mask to the column references identified in the analysis phase. A preparation phase may be employed (or included in the analysis phase) to initially collect information for the analysis.

Figure 1:
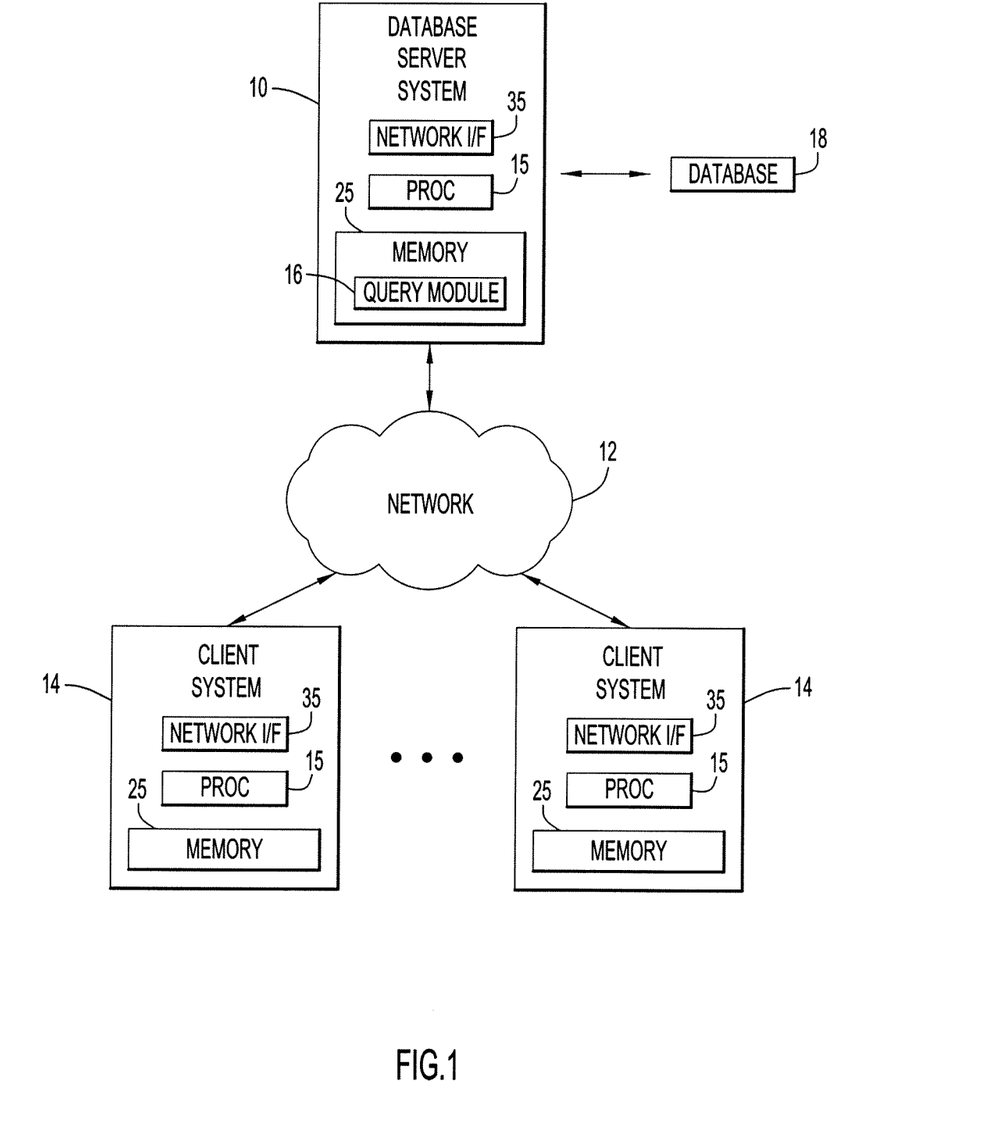
FIG. 1 is a diagrammatic illustration of an example computing environment for use with an embodiment of the present invention.

An example environment for use with present invention embodiments is illustrated in FIG. 1. Specifically, the environment includes one or more database or other server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to submit database or other queries to server systems 10 to retrieve information from a database system 18 for various applications. The server systems include a query module 16 to analyze and modify queries to enforce column masks of database table columns while maintaining the integrity of column data for results of database expressions. The query module preferably resides within a query compiler (e.g., SQL compiler, etc.) of server system 10 to modify a query during query compilation and produce a compiled (or executable) modified query for execution. However, the query module may reside on the server system as a separate module or embedded within other modules of the server system. The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired query, and may provide reports including query results (e.g., final results of queries with appropriate masking of values, etc.).

Server systems 10 and client systems 14 may be implemented by any conventional or other computer systems preferably equipped with a display or monitor, a base (e.g., including at least one processor 15, one or more memories 25 and/or internal or external network interfaces or communications devices 35 (e.g., modem, network cards, etc.)), optional input devices (e.g., a keyboard, mouse or other input device), and any commercially available and custom software (e.g., server/communications software, query module, browser/interface software, etc.).

In addition, query module 16 may include one or more modules or units to perform the various functions of present invention embodiments described below. The various modules (e.g., query module, etc.) of present invention embodiments may be implemented by any combination of any quantity of software and/or hardware modules or units, and may reside within memories 25 of the server systems for execution by processor 15.

The query transformation of present invention embodiments includes various phases. An analysis phase traverses a query in order to detect columns with enabled column masks, and to identify which column references within the query require the application of the column mask. The analysis phase basically traces or maps column references within the query to corresponding columns of underlying base tables in children or nested query blocks to facilitate determination of column references requiring application of column masks. The application phase uses the information gathered in the analysis phase to insert the column mask into the query. Query expressions that reference the column (and the corresponding column) may be replicated or duplicated in the presence of one or more consumers within the query that require masked values and one or more consumers within the query that require unmasked values. An initial preparation phase may be employed (e.g., for IBM DB2 for z/OS), or included within (e.g., for IBM DB2 for LINUX, UNIX, and WINDOWS) the analysis phase, that gathers the necessary information for the analysis and application phases.

Figure 2A:
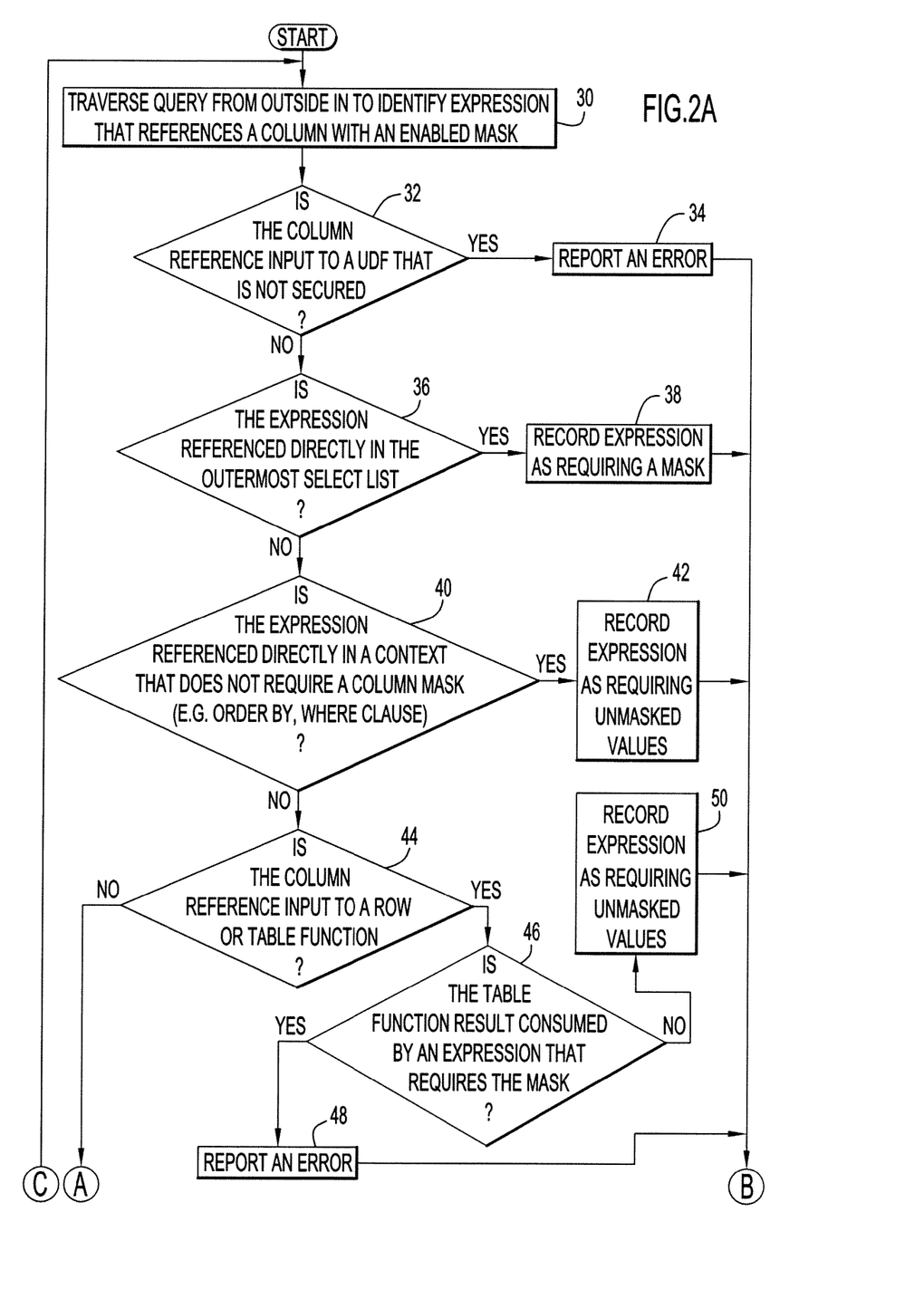
FIGS. 2A-2B are a procedural flow chart illustrating the manner in which a query is transformed to implement column masking while maintaining data integrity for results of database query expressions according to an embodiment of the present invention.
Figure 2B:
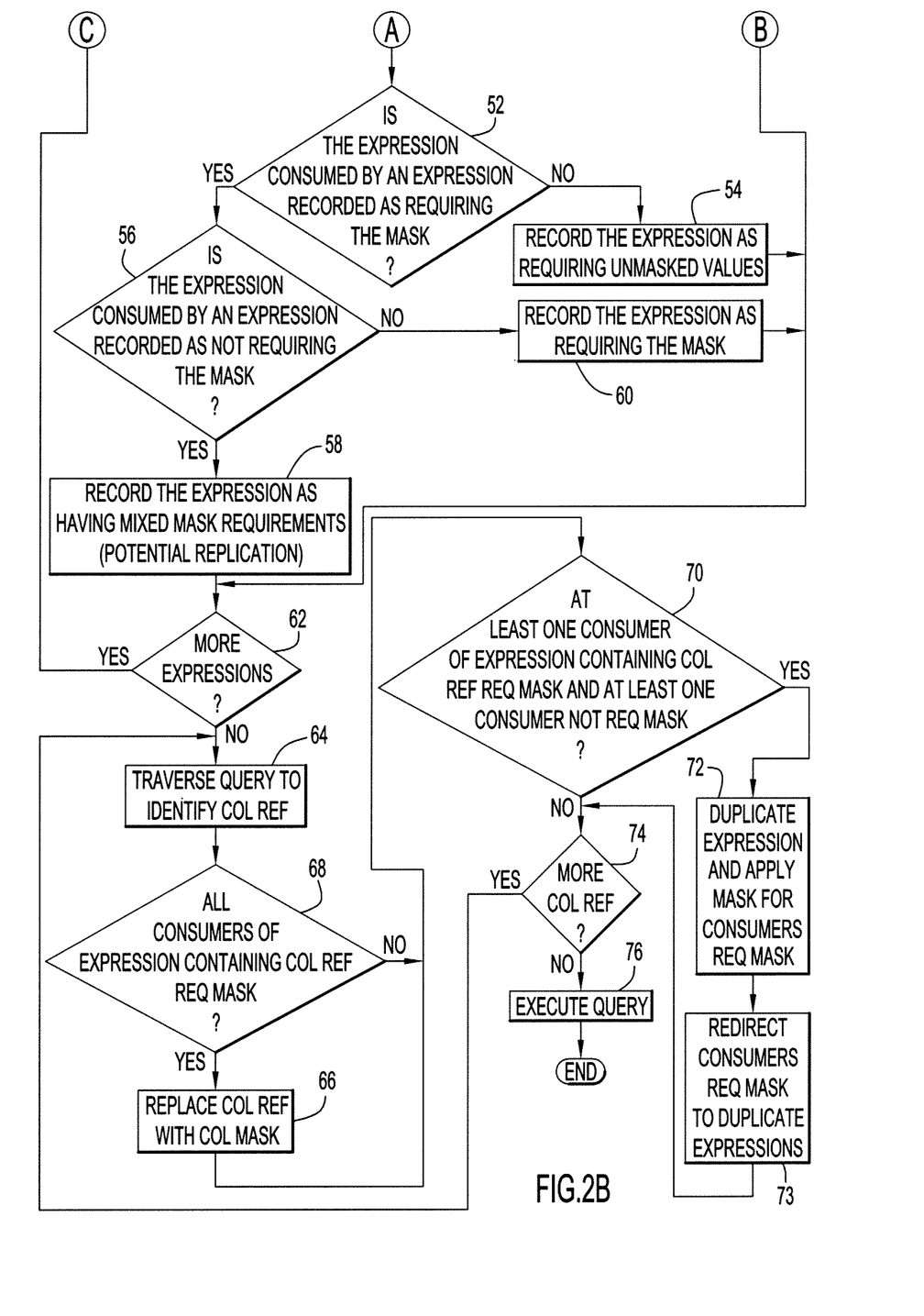

A manner in which query module 16 (e.g., via server system 10) transforms a query to implement column masking while maintaining data integrity for results of database query expressions according to an embodiment of the present invention is illustrated in FIGS. 2A-2B. Initially, query module 16 (e.g., via server system 10) receives and analyzes a database query from a client system 14 to determine various information. For example, the query is analyzed to identify references to database table columns, where the location of each column reference in the query (e.g., a database table column may be referenced in a SELECT expression, a WHERE expression, an ORDER BY expression, etc.) is recorded to maintain information with respect to column usage. This information may be stored within database system 18. When a database table column is referenced plural times within a query, the column may reside within plural locations. By way of example, if a database table column is referenced in a SELECT expression argument list of a subquery predicate, the column has two locations within the query, namely the WHERE clause (or predicate) and the SELECT expression. Similarly, when a database table column is referenced in a table user-defined function (UDF) argument, the column reference has two locations within the query, namely a FROM clause and the table UDF argument. Each of the column locations is recorded for subsequent analysis.

The query module (e.g., via server system 10) ascertains further information based on the query analysis (e.g., query block number that references the column, the ordinal position in the SELECT clause, the type of column (e.g., base table column, a table expression column, a view column, a work file column, etc.)). This information may be collected during the preparation (e.g., for IBM DB2 for z/OS) and/or analysis phases (e.g., for IBM DB2 for LINUX, UNIX, WINDOWS), and is similar to information captured during general query processing.

The analysis phase (e.g., performed by query module 16 via server system 10) analyzes the query, detects and records table columns with enabled column masks, identifies column references that require application of the column mask in response to being included within the final result set, and identifies column references requiring unmasked values. In the case of column references requiring only unmasked values, the corresponding columns are bypassed in the application phase since column masking does not need to be applied.

Query module 16 (e.g., via server system 10) traverses the query to identify all table columns with enabled column masks. For each identified column, all of the corresponding column references within the query are examined to determine when the column mask applies. A column reference that directly or indirectly forms an expression in the final result set requires the application of the column mask. A query may have varying internal representations based on the particular platform employed. Accordingly, a query may be traversed in various fashions to identify table columns based on the particular platform employed. For example, a query may be traversed from a SELECT expression argument list in the outermost query block to SELECT expression argument lists in inner query blocks (e.g., for IBM DB2 for z/OS, LINUX, UNIX, WINDOWS). Regardless of the platform employed, the analysis phase identifies the references to columns that require a column mask and references to columns that require unmasked values. In the case of a column reference in a nested SELECT expression providing data to two or more other expressions, one of which requiring the mask, the branching point is recorded for replication or duplication (of the expression and column) in the application phase as described below.

Specifically, the query module (e.g., via server system 10) traverses the query (e.g., outside in for IBM DB2 for z/OS, LINUX, UNIX, WINDOWS) to identify an expression that references a table column with an enabled column mask at step 30. If the column reference in the expression is provided to a non-secured user-defined function (UDF) (e.g., a UDF with a NOT SECURED attribute) as determined at step 32, an error is reported at step 34.

If a base table column (e.g., the base table refers to the underlying database table having the mask) with an enabled column mask is referenced directly or indirectly in the final result set, the column mask needs to be applied. Accordingly, when the identified expression is referenced directly in an argument list of an outermost SELECT expression within the query (e.g., indicating the column is referenced directly in the final result set) as determined at step 36, the expression is recorded as requiring application of the mask at step 38.

When the identified expression is referenced directly in a context that does not require a column mask (e.g., SELECT DISTINCT expression, ORDER BY expression, WHERE expression, etc.) as determined at step 40, the identified expression is recorded as requiring unmasked values at step 42. In this case, when the column mask does not need to be applied (e.g., since all references to the column are in contexts that do not require the mask (e.g., predicates)), the expression is bypassed in the application phase.

When the column reference within the identified expression is provided to a row or table function (e.g., a row or table function argument contains a column with an enabled column mask) as determined at step 44, query module 16 (e.g., via server system 10) determines the additional expressions within the query consuming (or referencing) the row or table function result. If the row or table function result is consumed by one or more additional expressions within the query requiring masked values as determined at step 46, an error is reported at step 48 (e.g., since application of the mask to the function may change the result set based on internal logic that utilizes the value of the arguments as keys). For example, different result sets (even number of rows) may be produced based on providing masked and unmasked values. However, the final result set for masked values should remain the same as for unmasked values, except that column masks are applied to the columns in the final result set. The number of rows in the result set should never change.

When the row or table function result is not consumed by additional expressions within the query requiring masked values as determined at step 46, the identified expression is recorded as requiring unmasked values at step 50.

When the identified expression is not consumed (or referenced) by an additional expression within the query requiring masked values (e.g., an additional expression recorded as requiring masked values) as determined at step 52 (FIG. 2B), the identified expression is recorded as requiring unmasked values at step 54.

If the identified expression is consumed by an additional expression within the query requiring masked values (e.g., an additional expression recorded as requiring masked values) as determined at step 52, query module 16 (e.g., via server system 10) determines the presence within the query of another expression consuming the identified expression and requiring unmasked values. If another expression consuming the identified expression and requiring unmasked values does not exist within the query (e.g., a base table column with an enabled column mask is referenced directly or indirectly in the final result set and is not referenced in any contexts requiring unmasked values) as determined at step 56, the identified expression is recorded as requiring masked values at step 60 (e.g., since the identified expression is consumed only by additional expressions requiring masked values). In this case, the mask expression replaces the column reference without duplication or replication of any SELECT expression argument list columns in the application phase. In other words, there is no need to maintain an unmasked version of the column in the query.

When another expression consuming the identified expression and requiring unmasked values does exist within the query as determined at step 56, the identified expression is recorded as having mixed mask requirements (e.g., since the identified expression is being consumed by expressions requiring masked and unmasked values, thereby indicating the potential need for duplication or replication of the identified expression and corresponding column) at step 58.

For example, if a column reference appears within a SELECT DISTINCT expression, this operation is performed on unmasked column values. The column reference within this expression is recorded as requiring unmasked (or original) column values (in addition to the requirement that a masked version of the expression be returned in the final result set). Similarly, when a column reference appears in an ORDER BY expression, the ordering is performed on the unmasked column values. A column reference within an ORDER BY expression does not require the column to appear in the final result set. However, if the column reference does appear in the final result set, mixed masking requirements are present. An example query of this type includes the following.

SELECT c1 FROM t1 ORDER BY c2, c1; (selecting a column, c1, from table, t1, with the results ordered by table columns c2, c1).

Column c2 is only referenced in the ORDER BY expression of the example query and, therefore, does not require a column mask. However, column c1 of table t1 is referenced in both the argument list of the outermost SELECT expression and the ORDER BY expression. The column reference in the SELECT expression argument list requires the column mask, while the column reference in the ORDER BY expression uses the unmasked column value. The column mask can be applied to the reference in the SELECT expression argument list while the reference in the ORDER BY expression retains the unmasked value as follows.

SELECT mask(c1) FROM t1 ORDER BY c2, c1; where mask(c1) represents the mask applied to base table column, c1.

When a column reference crosses query blocks (e.g., the column is initially referenced in a nested SELECT expression, but the expression with the column reference in the nested SELECT expression is referenced in outer query blocks), duplication or replication (of the expression with the column reference and the column) may be required. There may exist column references in outer query blocks that require masked values, and column references in outer query blocks that require unmasked values. An expression which is consumed by expressions with opposite requirements is recorded as requiring duplication (to satisfy the mixed requirements). Any expression which feeds the expression with mixed requirements then, by default, also has mixed requirements. Accordingly, these mixed requirements are recorded and the branching point identified. An example query includes the following.

SELECT x FROM (SELECT c1+10 FROM t1) AS t(x) WHERE x>5; (selecting a column, x, from a table formed by selecting a column, c1, from table, t1, and adding ten to the column value, where the results include column values of the formed table greater than five). The expression "x" in the argument list of the outermost SELECT expression is detected as an indirect reference to a column, c1, of a table, t1, where column c1 in this example has an enabled column mask. The expression "x" is recorded as requiring the column mask. The expression "x>5" in the outermost query block includes an indirect reference to column c1 of table c1, but in this case the column mask should not be applied. The expression "x>5" is recorded as requiring the column mask not be applied. The common expression that provides data to both expressions "x" and "x>5" is the expression in the nested SELECT list "c1+10". This common expression (and corresponding column) is duplicated or replicated as described below to enable a masked version (or masked column values)

to be used for the expression "x", and an unmasked version (or unmasked values) to be used for the expression "x>5".

Once each expression within the query is analyzed and information collected as determined at step 62, query module 16 (e.g., via server system 10) commences the application phase to modify the query and apply column masks based on the collected information. The query is traversed from the inner query block containing a base table column to the outer query blocks. In particular, a column reference is identified in the query at step 64. If all consumers of an expression that contains the column reference require the mask to be applied as determined at step 66, the column reference within the expression is replaced with the column mask at step 68. In particular, a column mask is typically implemented by query language code (e.g., SQL CASE) to define the conditions for and control column access. The query language code implementing the column mask is inserted into the expression in place of the column reference.

If mixed matching requirements are present (e.g., one or more consumers of the expression require masked column values and one or more other consumers of the expression require unmasked column values) as determined at step 70, the expression (and corresponding column) is duplicated or replicated at step 72, where the column mask replaces the column references in the duplicated expression (e.g., replacing the column reference with query language code implementing the mask as described above). The consumers requiring the column mask are redirected to the masked expression (instead of the original unmasked expression) at step 73.

Once each identified column reference has been processed as determined at step 74, the resulting modified query is produced in a compiled or executable form. The modified query is subsequently executed at step 76 to provide the masked results.

Special handling is typically needed for columns on the null-producing side of an outer join. A column mask inherits the nullability of the corresponding column. Thus, a column mask expression on a non-null column (e.g., column with a NOT NULL attribute) is itself non-null (e.g., inherits the NOT NULL attribute). When the column mask is applied to the null-producing side of an outer join, the column mask returns a null result, and does not mask null values produced by the join.

Figure 3A:
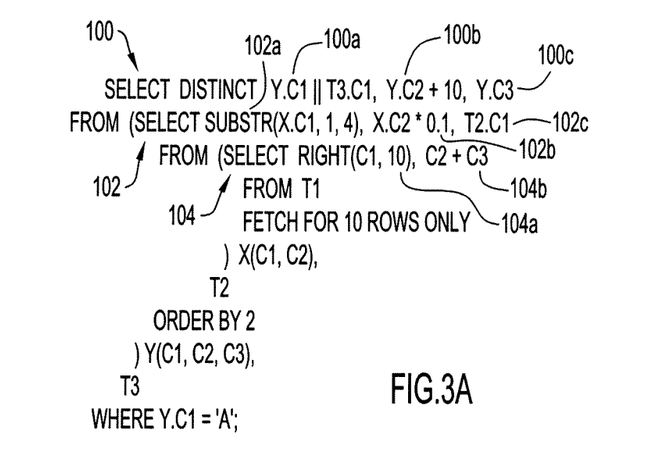
FIG. 3A is an example query to be transformed according to an embodiment of the present invention.
Figure 3B:
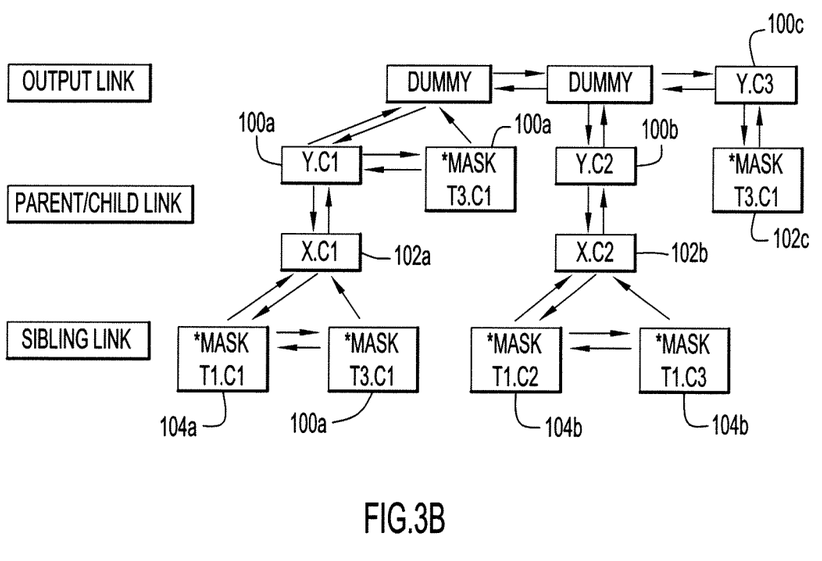
FIG. 3B is a graphical representation of the example query of FIG. 3A.
Figure 3C:
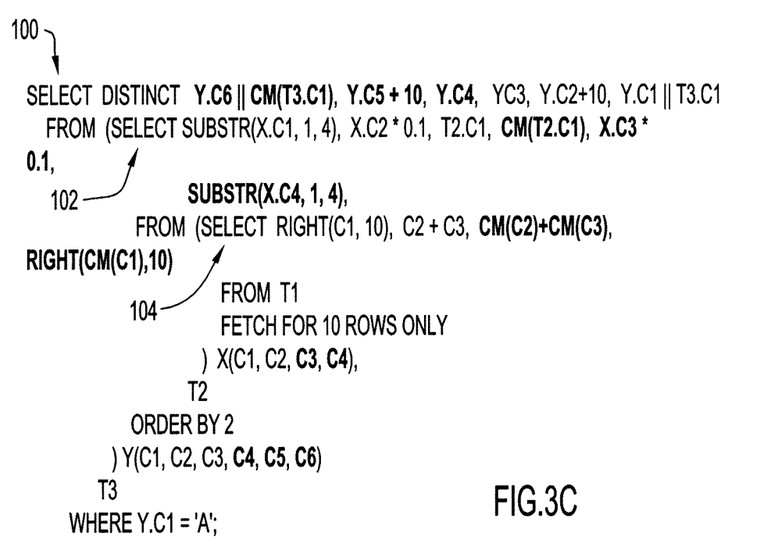
FIG. 3C is a resulting query produced from transforming the example query of FIG. 3A according to an embodiment of the present invention.

Operation of a present invention embodiment is described with respect to FIGS. 3A-3C. Initially, an example query is illustrated in FIGS. 3A-3B. Processing of the example query is explained, by way of example only, with respect to an internal query representation for a particular type of platform (e.g., IBM DB2 for z/OS). However, the example query may be processed in similar manners with respect to other platforms.

The example query includes nested SELECT expressions 100, 102, 104. SELECT expression 100 includes column references 100a (Y.C1||T3.C1), 100b (Y.C2+10), 100c (Y.C3), while SELECT expression 102 includes column references 102a (SUBSTR(X.C1, 1, 4)), 102b (X.C2*0.1), 102c (T2.C1). SELECT expression 104 includes column references 104a (RIGHT(C1, 10)), 104b (C2+C3). In this example, columns C1, C2, C3 of a base table T1 (e.g., T1.C1, T2.C2, T3.C3), column C1 of a base table T2 (e.g., T2.C1), and column C1 of a base table T3 (e.g., T3.C1) each have associated column masks.

The processing for the analysis phase starts from outermost SELECT expression 100 and, for each column reference 100a, 100b, 100c in the SELECT expression argument list, the processing traces or maps these column references to corresponding base table columns in children or nested query blocks. A graphical representation of the mappings of the column references between SELECT expressions 100, 102, 104 is illustrated in FIG. 3B. The usage of the column references in each query block (or SELECT expression 100, 102, 104) is examined and recorded (e.g., whether the column reference in the query block is for output only or is further referenced in other expressions or clauses, such as WHERE, HAVING, GROUP BY, ORDER BY, DISTINCT, etc.) in addition to other information (e.g., mixed masking requirements, etc.) described above. This tracing-inward processing terminates when a base table column with an enabled mask is reached within the query.

An example data structure produced by the analysis phase is shown below in Table I.

TABLE I

| Ref. No. | QNo | SELECT Ordinal Number | Column Name | Column Usage | Output Only | Output Link Previous | Output Link Next | Parent/Child Link Parent | Parent/Child Link Child | Sibling Link Previous | Sibling Link Next |
|---|---|---|---|---|---|---|---|---|---|---|---|
| 1 | 1 | 1 | Expression Dummy | n/a | N | 0 | 6 | 0 | 2 | 0 | 0 |
| 2 | 1 | 1 | Y.C1 | S, D, W | N | 0 | 0 | 1 | 3 | 0 | 5 |
| 3 | 2 | 1 | X.C1 | S | Y | 0 | 0 | 2 | 4 | 0 | 0 |
| 4 | 3 | 1 | T1.C1 | S | Y | 0 | 0 | 3 | 0 | 0 | 0 |
| 5 | 1 | 1 | T3.C1 | S, D | N | 0 | 0 | 1 | 0 | 2 | 0 |
| 6 | 1 | 1 | Expression Dummy | n/a | N | 1 | 11 | 0 | 7 | 0 | 0 |
| 7 | 1 | 2 | Y.C2 | S, D | N | 0 | 0 | 6 | 8 | 0 | 0 |
| 8 | 2 | 2 | X.C2 | S, O | N | 0 | 0 | 7 | 9 | 0 | 0 |
| 9 | 3 | 2 | T1.C2 | S | Y | 0 | 0 | 8 | 0 | 0 | 10 |
| 10 | 3 | 2 | T1.C3 | S | Y | 0 | 0 | 8 | 0 | 9 | 0 |
| 11 | 1 | 3 | Y.C3 | S, D | N | 6 | 0 | 0 | 12 | 0 | 0 |
| 12 | 2 | 3 | T2.C1 | S | Y | 0 | 0 | 11 | 0 | 0 | 0 |

The data structure includes the following information: Ref. No. (e.g., referring to a reference number for an entry), QNO (e.g., a query block number referring to the expression containing the column reference), SELECT Ordinal Number (e.g., the position of the column reference within the SELECT list), Column Name, Column Usage (e.g., the clause or expression containing the column reference (e.g., S (SELECT), D (DISTINCT), W (WHERE), O (ORDER BY), etc.), Output Only (e.g., whether the column reference is used for output only and not consumed by another expression that requires the unmasked values), Output Link, Parent/Child Link, and Sibling Link. The output, parent/child, and sibling links provide information pertaining to the graphical representation of the query and indicate the reference numbers of connected entries within the table (e.g., parent, child, previous, and next entries). The data structure may include any additional information (e.g., mixed match requirements, etc.).

The application phase traverses the information within the above data structure (Table I) from the inner base table columns, and replaces a base table column with the corresponding column mask in the query. For each entry in the data structure, the Output Only status of that entry and all parent entries are examined. If the status of each are output only, the column reference represented by the entry is replaced with the corresponding column mask. Otherwise, the column (and expression containing the column) is replicated, and the replicated column is replaced by the column mask. However, the original column in the outermost SELECT expression 100 is replaced with the column from the inner query block that has been applied with column masks, and the replicated column is unmasked and is used by those column usages requiring unmasked column values.

A resulting modified query is illustrated in FIG. 3C. The bold expressions and column references are added within SELECT expressions 100, 102, 104 as the result of the column mask applications. Bold CM(x) represents the application of a column mask (e.g., insertion of the query language code to apply the mask). The sort for the distinct expression operates on Y.C1||T3.C1, Y.C2 +10, Y.C3, in this sequence, only. Although there are six columns referenced in SELECT expression 100 for the modified query (e.g., compared to three column references in the original query), the masked versions of the three result columns in the original query (e.g., the initial three column references of SELECT expression 100) are returned to the user. The latter three column references are considered to be hidden from the final result set.

By way of further example, processing is described for the following example query.

SELECT X FROM TABLE (SELECT C1 FROM T1 UNION ALL SELECT C2 FROM T2) AS T(X) WHERE X>0.

In this example query, column C1 of a base table T1 (e.g., T1.C1) and column C2 of a base table T2 (e.g., T2.C2) each have associated column masks respectively denoted by C1_MASK and C2_MASK. The column masks are applied to the final result, but are not applied to the top level predicate (e.g., "X>0"). Processing of the example query is explained, by way of example only, with respect to an internal query representation for a particular type of platform (e.g., IBM DB2 for LINUX, UNIX, WINDOWS). However, the example query may be processed in similar manners with respect to other platforms.

The UNION ALL expression in the above query is internally handled as a function. In order to simplify the example, the following query (in a pseudo-query language (not valid SQL)) is equivalent to the original query:

SELECT X FROM TABLE (SELECT UNION_ALL(C1, C2) FROM T1, T2) AS T(X) WHERE X>0.

Analysis and application phases are completed for base table column T1.C1 followed by base table column T2.C2. The analysis phase for base table column T1.C1 records the expression "X" in the argument list of the outermost SELECT expression as requiring a column mask, and records the expression "X>0" in the outermost WHERE clause as requiring unmasked column values. The expression, UNION_ALL (C1, C2), is shared by both of the above expressions (e.g., requiring masked and unmasked column values) in the outermost SELECT expression, and is consequently recorded as having mixed masking requirements.

The application phase for base table column T1.C1 duplicates or replicates the UNION_ALL(C1, C2) expression (and corresponding column) since this expression has mixed masking requirements. Since the mask on column C1 is applied before the UNION_ALL expression is evaluated, both a masked (e.g., C1_MASK) and unmasked version (e.g., C1) of this column are required. After duplication, the mask is applied to the new expression, and the column reference that requires the mask, "X", in the outermost SELECT expression, is modified to consume the masked expression (e.g., XMASK). This intermediate query (since the mask for base table column T2.C2 has not yet been applied) takes the following form:

SELECT XMASK FROM TABLE (SELECT UNION_ALL(C1, C2), UNION_ALL(C1_MASK, C2) FROM T1, T2) AS T(X, XMASK) WHERE X>0.

The analysis phase for base table column T2.C2 records "XMASK" in the outermost SELECT expression of the intermediate query as requiring the mask, and the expression "X>0" as not requiring the mask. Since XMASK is a consumer of the expression, UNION_ALL(C1_MASK, C2), XMASK is similarly recorded as requiring the mask. The expression "X>0" is a consumer of the expression, UNION_ALL(C1, C2), and is recorded as requiring unmasked values.

The application phase for base table column T2.C2 has no expressions with mixed masking requirements in the example query. Accordingly, the mask for column C2 (e.g., C2_MASK) is applied to the expression, UNION_ALL (C1_MASK, C2). Since this expression is already consumed by the expression "X" in the outermost SELECT expression, no further changes are required. The final modified query has the following form:

SELECT XMASK FROM TABLE (SELECT UNION_ALL(C1, C2), UNION_ALL(C1_MASK, C2_MASK) FROM T1, T2) AS T(X, XMASK) WHERE X>0.

Reverting back to the syntax used in the original user query, the resulting modified query includes:

SELECT XMASK FROM TABLE (SELECT C1, C1_MASK FROM T1 UNION_ALL SELECT C2, C2_MASK FROM T2) AS T(X, XMASK) WHERE X>0.

It will be appreciated that the embodiments described above and illustrated in the drawings represent only a few of the many ways of implementing embodiments for query transformation for masking data within database objects.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any combination of commercially available and custom software (e.g., browser software, communications software, server software, query module, etc.). These systems may include any types of monitors and input devices (e.g., keyboard, mouse, voice recognition, etc.) to enter and/or view information.

It is to be understood that the software (e.g., query module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., query module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., table column reference, usage, masking requirements, relationships within the query, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data (e.g., table column reference, usage, masking requirements, relationships within the query, etc.). Further, the data structure to store information from the analysis phase may be implemented by any conventional or other data structures (e.g., files, arrays, lists, stacks, queues, etc.) to store information, and may be stored in any desired storage unit (e.g., database, data or other repositories, etc.).

Present invention embodiments are preferably utilized with SQL (e.g., generally indicated herein in upper case), but any desired query or other language for storage access (e.g., SQL, etc.) may be used with any types of expressions or statements within that language, and with any type of references to any database objects or elements (e.g., tables, rows, columns, etc.). The query may include any quantity of nested levels or sub-queries, and may be traversed in any desired fashion (e.g., inner to outer blocks, outer to inner blocks, etc.) to collect information and apply masks to database object references.

The masks may be associated with any column type database objects, and be applied to expressions in any desired fashion (e.g., replace reference with code, etc.). The columns or other database objects or expressions may be duplicated in any desired fashion (e.g., additional argument, additional statement or expression, etc.), and any quantity of times to provide masked and unmasked values. The mask may be applied to the original or duplicated column or expression. The application of the mask to a reference may be based on any desired criteria (e.g., output only, location or usage of reference within the query, expressions consuming or consumed by other expressions, etc.), and may be applied either prior to or subsequent evaluation of any expression containing the reference (e.g., apply the mask prior to or subsequent a mathematical or other operation including the reference, etc.).

Query modification preferably occurs during compilation of the query. The query may be modified in any desired fashion to provide appropriate masked and unmasked values (e.g., re-arrangement, modification, addition and/or removal of expressions or statements, arguments, formation of additional queries collectively providing desired results, etc.).

Present invention embodiments may be utilized for any applications capable of providing column or other database object masking. However, a broad set of scenarios for which column masking (and FGAC in general) may not apply include:

views, aliases, synonyms, nicknames (including federated three part names), temp tables, or typed tables. These types of objects generally can not have column masks or defined permissions. FGAC is applied to the underlying base tables with row or column access control enabled, when a view, an alias, or a synonym is referenced in the query. However, the temp table belongs to the category for which a permission or mask cannot be defined and, therefore, nothing applies in this case;

table access for the purpose of maintaining integrity (referential integrity (RI), constraints, etc.);

Materialized Query Table (MQT) refresh, where access control is generally not applied to the base tables or the MQT;

MQT access as part of rerouting a query. Column masks on the underlying base tables are applied prior to MQT matching, but the access control rules on the MQT itself are generally not applied;

table access as part of a SET INTEGRITY statement;

trigger transition tables and transition variables;

temporal history table access to service an AS OF query. The access controls on the system temporal table are applied to the history table, but access control rules on the history table are generally not applied;

internal SQL to populate a temporal history table;

internal SQL statements and tools (e.g., explain, event monitor, redistribute, etc.);

table access within a column mask or row permission; and

Label-based access control (LBAC) is generally not applied to table access in a column mask.

The present invention embodiments are not limited to the specific tasks or algorithms described above, but may be utilized for modifying queries for applying masks for any types of databases, query languages, database objects, and expressions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of processing a database query comprising:
    identifying one or more expressions within the database query utilizing a database object to which value masking is applied;
    determining masking requirements for each identified expression;
    replicating the database object utilized by that identified expression to provide a masked version and an unmasked version of the database object in response to the masking requirements for that expression including masked values and unmasked values of that database object;
    applying the value masking of the database object to the identified expressions within the database query based on the determined masking requirements to produce search results with masked values for the database query; and
    executing the query against the masked version of the database object and the unmasked version of the database object.

2. The computer-implemented method of claim 1, wherein the database object includes a column of a table.

3. The computer-implemented method of claim 1, wherein applying the value masking includes:
    utilizing the masked version of the database object for identified expressions with determined masking requirements including masked values; and
    utilizing the unmasked version of the database object for identified expressions with determined masking requirements including unmasked values.

4. The computer-implemented method of claim 1, wherein the database query includes a plurality of nested levels.

5. The computer-implemented method of claim 4, wherein an identified expression with a determined masking requirement including masked values includes an identified expression within an outermost nested level of the database query.

6. The computer-implemented method of claim 4, wherein determining the masking requirements for each identified expression includes:
    mapping the identified expressions through the nested levels to a base database object to which value masking is applied and determining the masking requirements for that identified expression based on the masking requirements of corresponding mapped expressions.

7. The computer-implemented method of claim 1, wherein an identified expression with a determined masking requirement including unmasked values includes an identified expression that performs at least one of ordering and filtering data within the search results.

8. A system for processing a database query comprising:
    a computer system including at least one processor configured to:
        identify one or more expressions within the database query utilizing a database object to which value masking is applied;
        determine, masking requirements for each identified expression;
        replicate the database object utilized by that identified expression to provide a masked version and an unmasked version of the database object in response to the masking requirements for that expression including masked values and unmasked values of that database object;
        apply the value masking of the database object to the identified expressions within the database query based on the determined masking requirements to produce search results with masked values for the database query; and
        execute the query against the masked version of the database object and the unmasked version of the database object.

9. The system of claim 8, wherein the database object includes a column of a table.

10. The system of claim 8, wherein applying the value masking includes:
    utilizing the masked version of the database object for identified expressions with determined masking requirements including masked values; and
    utilizing the unmasked version of the database object for identified expressions with determined masking requirements including unmasked values.

11. The system of claim 8, wherein the database query includes a plurality of nested levels.

12. The system of claim 11, wherein an identified expression with a determined masking requirement including masked values includes an identified expression within an outermost nested level of the database query.

13. The system of claim 11, wherein determining the masking requirements for each identified expression includes:
    mapping the identified expressions through the nested levels to a base database object to which value masking is applied and determining the masking requirements for that identified expression based on the masking requirements of corresponding mapped expressions.

14. The system of claim 8, wherein an identified expression with a determined masking requirement including unmasked values includes an identified expression that performs at least one of ordering and filtering data within the search results.

15. A computer program product for processing a database query comprising:
    a computer readable storage medium having computer readable program code embodied therewith, the computer readable program code comprising computer readable program code configured to:
        identify one or more expressions within the database query utilizing a database object to which value masking is applied;
        determine masking requirements for each identified expression;
        replicate the database object utilized by that identified expression to provide a masked version and an unmasked version of the database object in response to the masking requirements for that expression including masked values and unmasked values of that database object;

apply the value masking of the database object to the identified expressions within the database query based on the determined masking requirements to produce search results with masked values for the database query; and execute the query against the masked version of the database object and the unmasked version of the database object.

16. The computer program product of claim 15, wherein the database object includes a column of a table.

17. The computer program product of claim 15, wherein applying the value masking includes:

utilizing the masked version of the database object for identified expressions with determined masking requirements including masked values; and utilizing the unmasked version of the database object for identified expressions with determined masking requirements including unmasked values.

18. The computer program product of claim 15, wherein the database query includes a plurality of nested levels, and an identified expression with a determined masking requirement including masked values includes an identified expression within an outermost nested level of the database query.

19. The computer program product of claim 15, wherein the database query includes a plurality of nested levels, and determining the masking requirements for each identified expression includes:

mapping the identified expressions through the nested levels to a base database object to which value masking is applied and determining the masking requirements for that identified expression based on the masking requirements of corresponding mapped expressions.

20. The computer program product of claim 15, wherein an identified expression with a determined masking requirement including unmasked values includes an identified expression that performs at least one of ordering and filtering data within the search results.

21. The computer-implemented method of claim 2, wherein replicating the database object comprises replicating the column of the table to provide a masked version of the column and an unmasked version of the column; and wherein applying the value masking includes:

utilizing the masked version of the column for identified expressions with determined masking requirements including masked values; and utilizing the unmasked version of the column for identified expressions with determined masking requirements including unmasked values.

* * * * *